United States Patent
Li et al.

(10) Patent No.: US 11,604,629 B1
(45) Date of Patent: Mar. 14, 2023

(54) AUTOMATIC WORKFLOW GENERATION BASED ON ANNOTATED CODE STATEMENTS

(71) Applicant: eBay Inc., San Jose, CA (US)

(72) Inventors: Tianyou Li, Shanghai (CN); Pan Deng, Shanghai (CN); Gavin Zhu, Shanghai (CN)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 17/470,219

(22) Filed: Sep. 9, 2021

(51) Int. Cl.
*G06F 8/41* (2018.01)
*G06F 9/48* (2006.01)
*G06F 16/25* (2019.01)

(52) U.S. Cl.
CPC .............. *G06F 8/433* (2013.01); *G06F 8/427* (2013.01); *G06F 9/4881* (2013.01); *G06F 16/254* (2019.01)

(58) Field of Classification Search
CPC ........ G06F 8/433; G06F 8/427; G06F 9/4881; G06F 16/254
USPC .................................................. 717/140–160
See application file for complete search history.

(56) References Cited

U.S. PATENT DOCUMENTS

| | | | | |
|---|---|---|---|---|
| 4,931,928 A | * | 6/1990 | Greenfeld ............... | G06F 8/436 717/114 |
| 7,219,339 B1 | * | 5/2007 | Goyal .................. | H04L 41/0879 717/142 |
| 7,448,022 B1 | * | 11/2008 | Ram ................... | G06F 9/45504 717/120 |
| 8,095,515 B2 | | 1/2012 | Sereni et al. | |
| 8,141,068 B1 | * | 3/2012 | Thompson .............. | G06F 8/445 717/161 |
| 8,490,072 B2 | * | 7/2013 | Andrade ................ | G06F 8/443 717/132 |
| 8,566,789 B2 | * | 10/2013 | Siddaramappa ........ | G06F 16/80 707/765 |
| 9,250,886 B2 | * | 2/2016 | Gnech ...................... | G06F 8/61 |

(Continued)

OTHER PUBLICATIONS

Siddiqui et al, "Semantic-based on-demand Synthesis of Grid Activities for Automatic Workflow Generation", IEEE, pp. 43-50 (Year: 2007).*

Alshaboti et al, "Automatic Device Selection and Access Policy Generation based on User Preference for IoT Activity Workflow", IEEE, pp. 769-774 (Year: 2019).*

(Continued)

*Primary Examiner* — Anil Khatri
(74) *Attorney, Agent, or Firm* — FIG. 1 Patents (57) ABSTRACT

Automatic workflow generation is described. One or more files containing code statements for accessing and modifying information in a destination database is received. The code statements are parsed from the one or more files and dependencies between the code statements are determined. A dependency graph is built by arranging the code statements according to the dependencies between the code statements. The dependency graph is partitioned by identifying at least one barrier code statement having an unclear dependency and dividing the dependency graph between code statements occurring prior to the at least one barrier code statement and code statements occurring after the at least one barrier code statement. Jobs are scheduled based on the partitioned dependency graph, and the code statements are annotated according to the scheduled jobs. A workflow is then automatically generated based on the annotated code statements.

20 Claims, 9 Drawing Sheets

(56) References Cited

U.S. PATENT DOCUMENTS

| | | | |
|---|---|---|---|
| 9,262,228 B2* | 2/2016 | Bond | G06F 9/5038 |
| 9,436,922 B2* | 9/2016 | Agarwal | G06Q 10/0633 |
| 9,875,087 B2* | 1/2018 | Scholz | G06F 8/427 |
| 10,262,271 B1* | 4/2019 | Doddi | G06N 20/00 |
| 10,922,145 B2 | 2/2021 | Louer | |
| 11,392,844 B1* | 7/2022 | Rao | G06N 20/00 |
| 11,422,797 B1* | 8/2022 | Zhang | G06F 8/75 |
| 11,442,692 B1* | 9/2022 | B | G06F 3/167 |

OTHER PUBLICATIONS

Mao et al, "Auto-Scaling to Minimize Costand Meet Application Deadlines in Cloud Workflows", ACM, pp. 1-12 (Year: 2011).*

Kiran et al, "A Prediction Module to Optimize Scheduling in a Grid Computing Environment", IEEE, pp. 888-893 (Year: 2008).*

Shan et al, "Modeling and Performance Evaluation of Hierarchical Job Scheduling on the Grids", IEEE, pp. 1-8 (Year: 2007).*

Barth et al, "Shaving Peaks by Augmenting the Dependency Graph", ACM, pp. 181-191 (Year: 2019).*

Cheng et al, "SMT-based Scheduling for Multiprocessor Real-Time Systems", IEEE, pp. 1-7 (Year: 2016).*

Saxena, "Simplify Data Pipelines with AWS Glue Automatic Code Generation and Workflows", Retrieved from the Internet URL:<https://aws.amazon.com/blogs/big-data/simplify-data-pipelines-with-aws-glue-automatic-code-generation-and-workflows/>Apr. 29, 2020, 7 pages.

SQLFlow, "SQLFlow Parser", Retrieved from the Internet URL :<https://sql-machine-learning.github.io/sqlflow/doc/design/sqlflow_parser/>, Accessed on Nov. 30, 2021, 5 pages.

\* cited by examiner

AUTOMATIC WORKFLOW GENERATION BASED ON ANNOTATED CODE STATEMENTS

BACKGROUND

Extract, Transform and Load (ETL) is a process used to collect data from various sources, transform the data based on business rules, and then load the transformed data into a destination database. Conventionally, ETL developers obtain structured query language (SQL) files containing SQL code statements and then manually create the workflows from the SQL files. However, a large entity may have thousands of ETL jobs running in their data warehouse on any given day. As such, the manual process for creating workflows from SQL files is extremely time consuming even with experienced ETL developers. Moreover, the quality of the workflows often depends on the developers experience and cannot be standardized.

SUMMARY

Automatic workflow generation is described. One or more files containing code statements for accessing and modifying information in a destination database is received. The code statements are parsed from the one or more files and dependencies between the code statements are determined. A dependency graph is built by arranging the code statements according to the dependencies between the code statements. The dependency graph is partitioned by identifying at least one barrier code statement having an unclear dependency and dividing the dependency graph between code statements occurring prior to the at least one barrier code statement and code statements occurring after the at least one barrier code statement. Jobs are scheduled based on the partitioned dependency graph, and the code statements are annotated according to the scheduled jobs. A workflow is then automatically generated based on the annotated code statements.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Automatic workflow generation is described. The techniques described herein automatically generate workflows from files containing code statements (e.g., SQL files). To do so, a workflow system parses the code statements from the files and determines dependencies between the code statements, such as by determining whether a code statement should be performed sequential to or parallel with another code statement. Next, the workflow system builds a dependency graph by arranging the code statements according to the dependencies between the code statements. In some cases, the code statements may have an unclear dependency which makes the dependency graph inaccurate. To solve this problem, the workflow system automatically partitions the dependency graph by identifying at least one barrier code statement having an unclear dependency and dividing the dependency graph between code statements occurring prior to the at least one barrier code statement and code statements occurring after the at least one barrier code statement.

Next, the workflow system schedules jobs based on the partitioned dependency graph and annotates the code statements according to the scheduled jobs. For example, based on the dependency graph, the system can group the code statements into jobs, and then add annotations to the code statements. The annotations may identify the job or group of the code statements, as well as define any other jobs which the job depends on, e.g., which must complete before the job can begin. Finally, the workflow is automatically generated based on the annotated code statements. Notably, the annotations are considered by the workflow system when generating the workflows, even though the annotations are not technically a part of the code statements. Moreover, the workflow can be automatically generated without accessing any table schemas associated with the code statements. Doing so decreases the amount of time required to generate the workflows from the code statements as compared to conventional systems.

In the following discussion, an example environment is first described that may employ the techniques described herein. Example implementation details and procedures are then described which may be performed in the example environment as well as other environments. Performance of the example procedures is not limited to the example environment and the example environment is not limited to performance of the example procedures.

Example Environment

Figure 1:
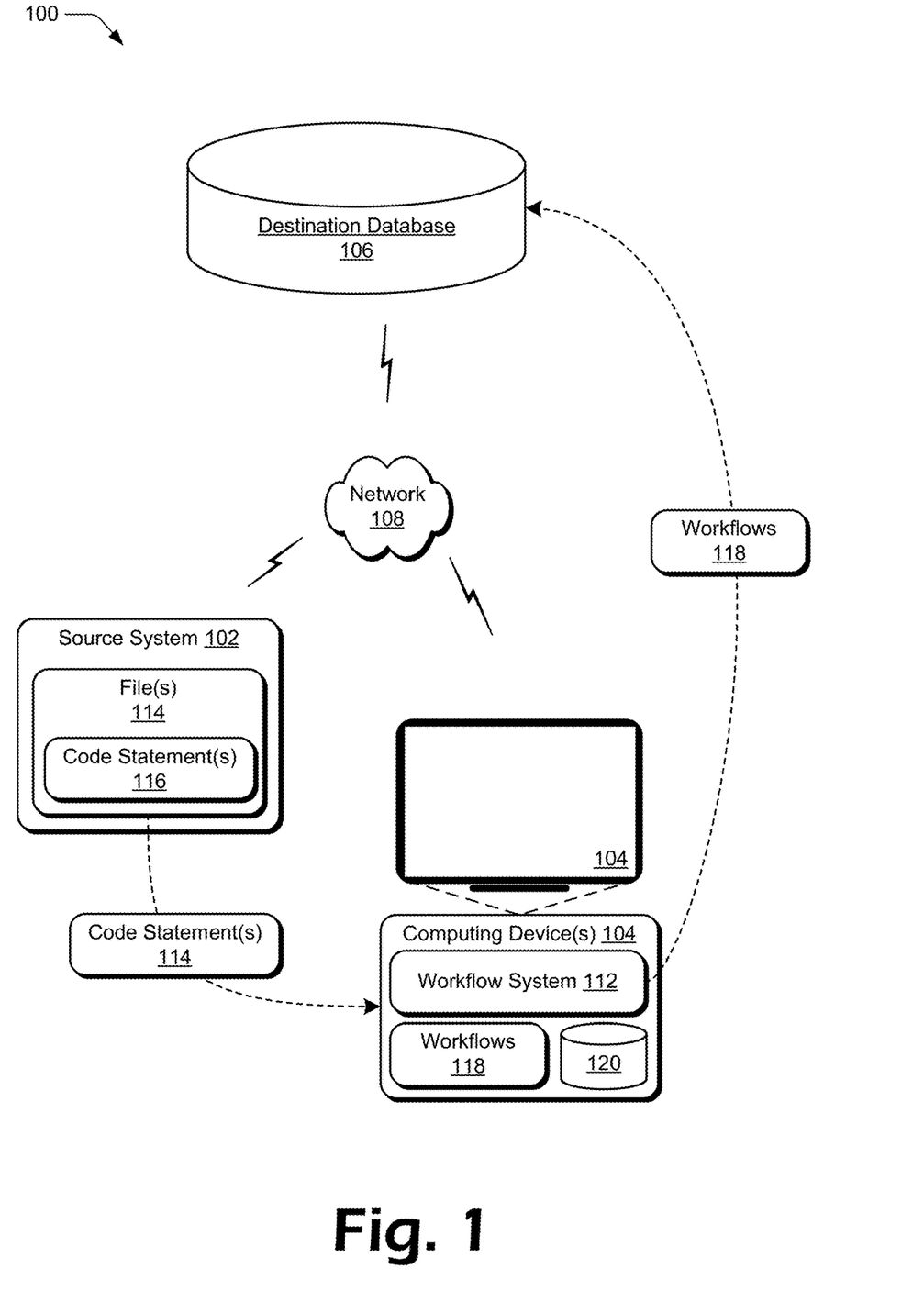
FIG. 1 is an illustration of an environment in an example implementation that is operable to employ techniques described herein.

FIG. 1 is an illustration of an environment 100 in an example implementation that is operable to employ techniques described herein. The illustrated environment 100 includes source system 102, one or more computing devices 104, and one or more destination databases 106. The source system 102, computing devices 104, and destination databases 106 may be communicatively coupled, one to another via a network 108, e.g., the Internet.

These entities may be implemented using computing devices, which are configurable in a variety of ways. A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown and described in some instances, a computing device may be representative of a plurality of different devices, such as multiple servers utilized by a business to perform operations "over the cloud" as described in FIG. 9.

The computing device 104 is depicted as including a workflow system 112 which includes functionality to obtain files 114 containing code statements 116 from source system 102 and automatically transform the code statements 116 into workflows 118 suitable for the destination database 106. The workflows 118 may be stored in a storage 120 at the computing device 104. Generally, the files 114 contain code statements 116 for accessing and modifying information in destination database 106.

By way of example, the files 114 and code statements 116 may correspond to a structured query language (SQL) file containing SQL code statements. SQL is a language used to access and modify information in a database. The SQL code statements, for example, can be configured to create or modify database structures, insertions, updates, or deletions, to name just a few.

Unlike conventional systems which require developers to manually create workflows, the workflow system 112 automatically generates workflows 118 from the files 114 containing code statements 116 (e.g., SQL files). Generally, a workflow 118 is a sequence of tasks that processes a set of data for the destination database 106. As described in more detail with regards to FIG. 2, below, the workflow system 112 parses the code statements 116 from the files 114 and determines dependencies between the code statements 116, such as whether a code statement should be performed sequential to or parallel with another code statement. Next, the workflow system 112 builds a dependency graph by arranging the code statements 116 according to the dependencies between the code statements 116. In some cases, the code statements 116 may have an unclear dependency which makes the dependency graph inaccurate. To solve this problem, the workflow system 112 automatically partitions the dependency graph by identifying at least one barrier code statement having an unclear dependency and dividing the dependency graph between code statements 116 occurring prior to the at least one barrier code statement and code statements 116 occurring after the at least one barrier code statement.

The workflow system 112 then schedules jobs based on the partitioned dependency graph, and annotates the code statements according to the scheduled jobs. For example, based on the dependency graph, the workflow system 112 can group the code statements 116 into jobs, and then add annotations to the code statements 116. These annotations may identify the job or group of the code statements 116, as well as define any other jobs which the job depends on, e.g., which must complete before the job can begin. Finally, workflows 118 are automatically generated for the destination database 106 based on the annotated code statements. Notably, the workflow system 112 is configured to consider the annotations when generating the workflows 118, even though the annotations are not technically a part of the code statements 116. Moreover, the workflows 118 can be automatically generated without accessing any schemas associated with the code statements 116 in files 114.

Figure 2:
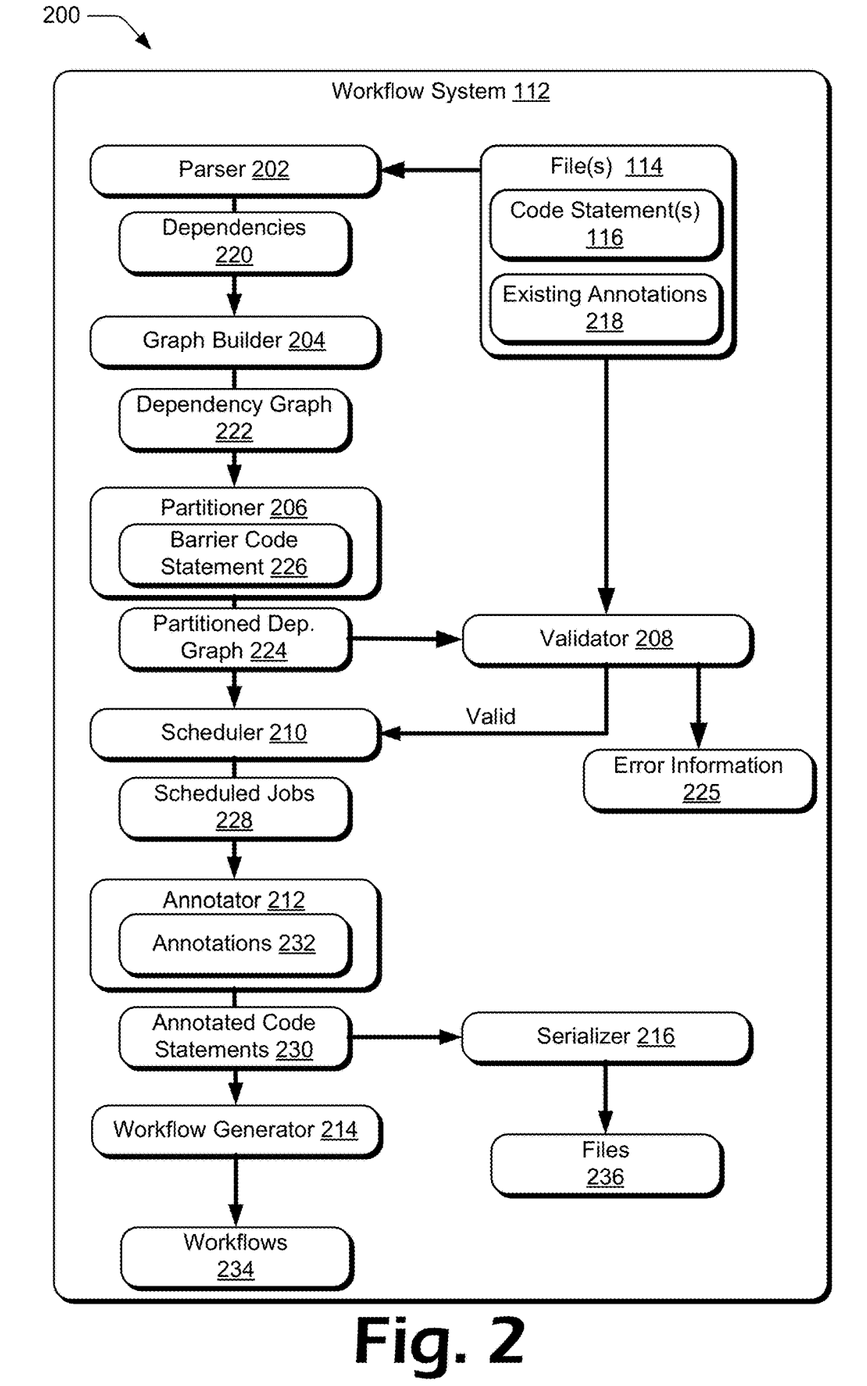
FIG. 2 depicts an example in which the workflow system of FIG. 1 automatically generates workflows for a destination database from files containing code statements provided by one or more data sources.

FIG. 2 depicts an example 200 in which the workflow system 112 of FIG. 1 automatically generates workflows for a destination database from files containing code statements provided by one or more data sources. In the illustrated example 200, the workflow system 112 is depicted as including a parser 202, a graph builder 204, a partitioner 206, a validator 208, a scheduler 210, an annotator 212, a workflow generator 214, and a serializer 216. Although depicted with these eight modules, in implementation the workflow system 112 may include more, fewer, or different modules to automatically generate workflows for a destination database without departing from the spirit or scope of the techniques described herein.

In the illustrated example 200, the parser 202 obtains files 114 containing code statements 116 from the source system 102. Generally, the files 114 contain code statements 116 for accessing and modifying information in destination database 106. By way of example, the files 114 and code statements 116 may correspond to a structured query language (SQL) file containing SQL code statements. SQL is a language used to access and modify information in a database. The SQL code statements, for example, can be configured to create or modify database structures, insertions, updates, or deletions, to name just a few. In this example, files 114 are depicted as also including existing annotations 218. Generally, these existing annotations 218 correspond to "non-code" portions of the files 114 which are not configured for execution.

Figure 3:
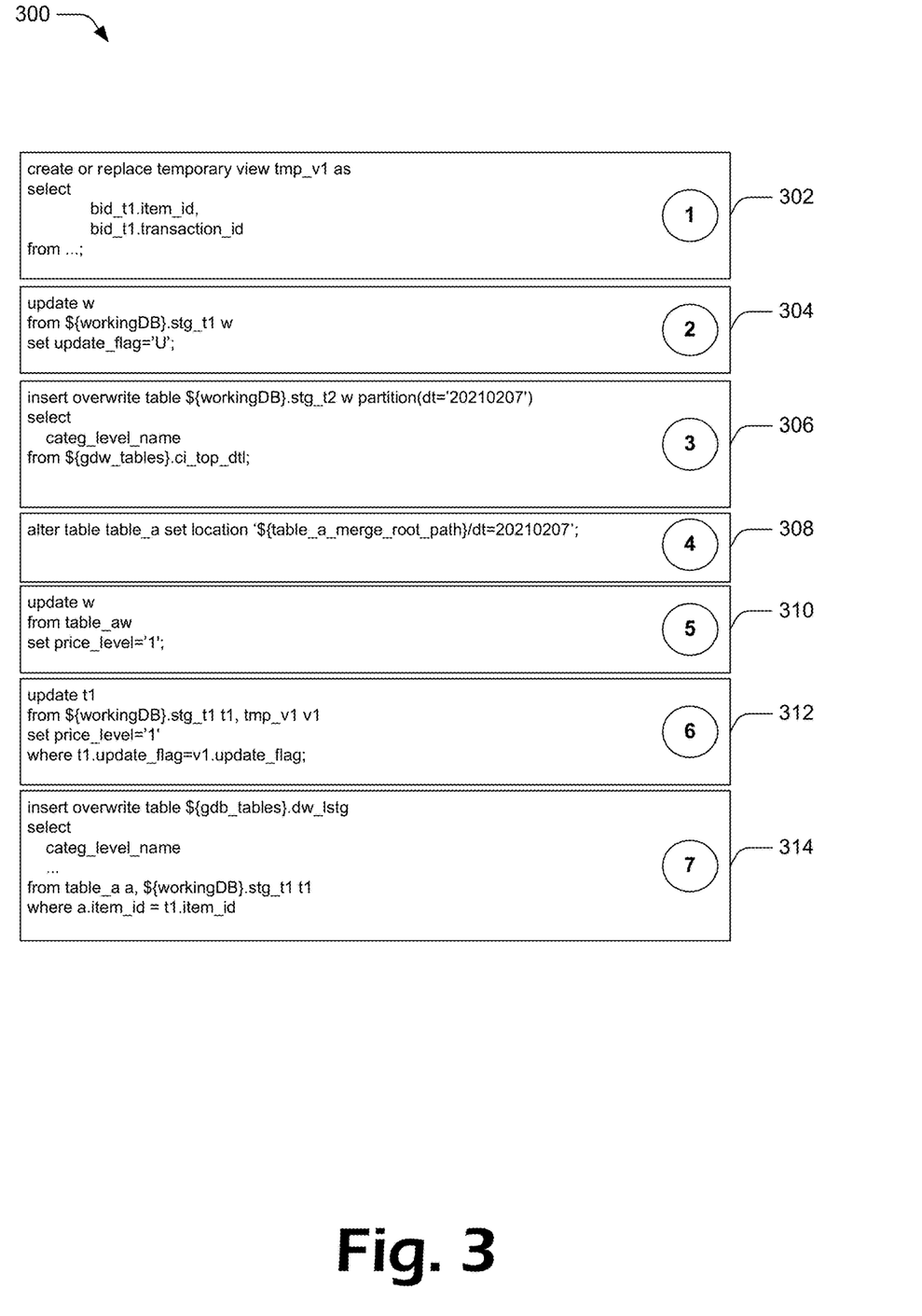
FIG. 3 depicts an example of code statements which have been parsed from one or more files.

The parser 202 parses the code statements 116 from the files 114. By way of example, consider FIG. 3 which depicts an example 300 of code statements which have been parsed from one or more files. Example 300 includes parsed code statements 302, 304, 306, 308, 310, 312, and 314. In this example, code statements 302-314 each correspond to an SQL statement that has been parsed from an SQL file. Each of the code statements 302, 304, 306, 308, 310, 312, and 314 are also identified by a circle with numbers 1, 2, 3, 4, 5, 6, and 7, respectively. While this example includes just seven code statements, it is to be appreciated that some SQL files may include thousands of code statements which can be parsed by parser 202.

In addition to parsing the code statements 116 from the files 114, the parser 202 determines dependencies 220 between the code statements 116. The dependencies 220 for a respective code statement 116 define other code statements 116 which must be completed before the respective code statement 116 can begin. Notably, the parser 202 is configured to determine the dependencies 220 without the need to access other information from the source system 102. For example, unlike conventional systems, the parser 202 does not access table schemas associated with the code statements 116 in order to determine the dependencies 220. Doing so decreases the amount of time required to generate the workflows from the code statements as compared to conventional systems.

The graph builder 204 obtains the parsed code statements 116 and the dependencies 220 from the parser 202 and builds a dependency graph 222 by arranging the code statements 116 according to the dependencies 220. By way of example, consider FIG. 4 which depicts an example 400 of a dependency graph generated by the graph builder 204. In example 400, the graph builder 204 has built dependency graph 402 by arranging code statements 302, 304, 306, 308, 312, and 314 based on dependencies between these code statements. Notably, dependency graph 402 arranges code statements 302, 304, 306, and 308 in parallel to indicate that these code statements can occur simultaneously. In contrast, code statement 310 is arranged after code statements 302 and 304 are finished executing, while code statement 312 is arranged after code statement 308 is finished executing. Code statement 314 is arranged after completion of code statements 310 and 312.

Partitioner 206 generates a partitioned dependency graph 224 by partitioning the dependency graph 222 generated by the graph builder 204. To do so, the partitioner 206 identifies at least one barrier code statement 226 and divides the dependency graph 222 between the code statements occurring prior to the at least one barrier code statement 226 and code statements occurring after the at least one barrier code statement 226. As described herein, the barrier code statement 226 corresponds to a code statement that has an unclear dependency, which makes it difficult to schedule without additional information.

Figure 4:
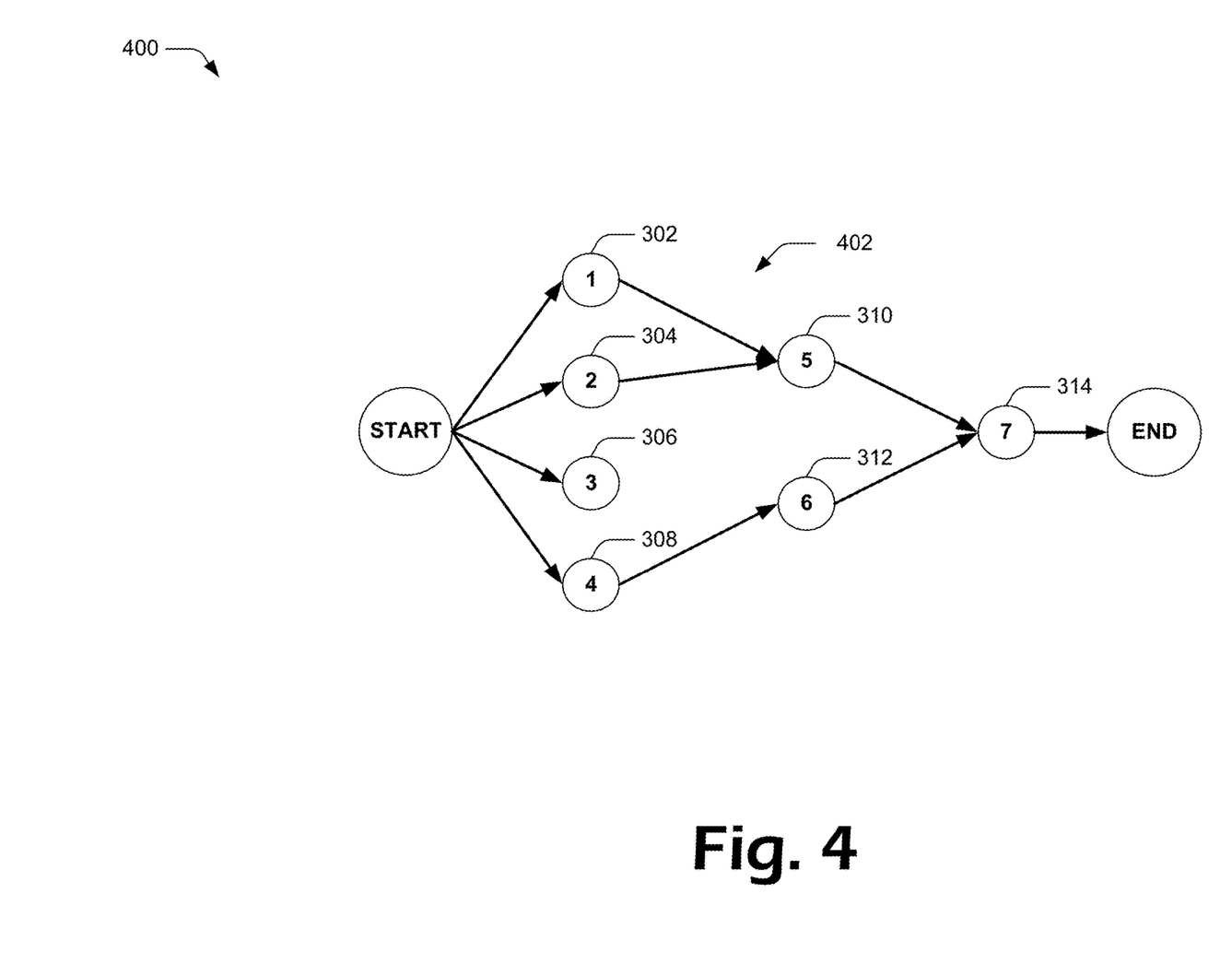
FIG. 4 depicts an example of a dependency graph generated by a graph builder.
Figure 5:
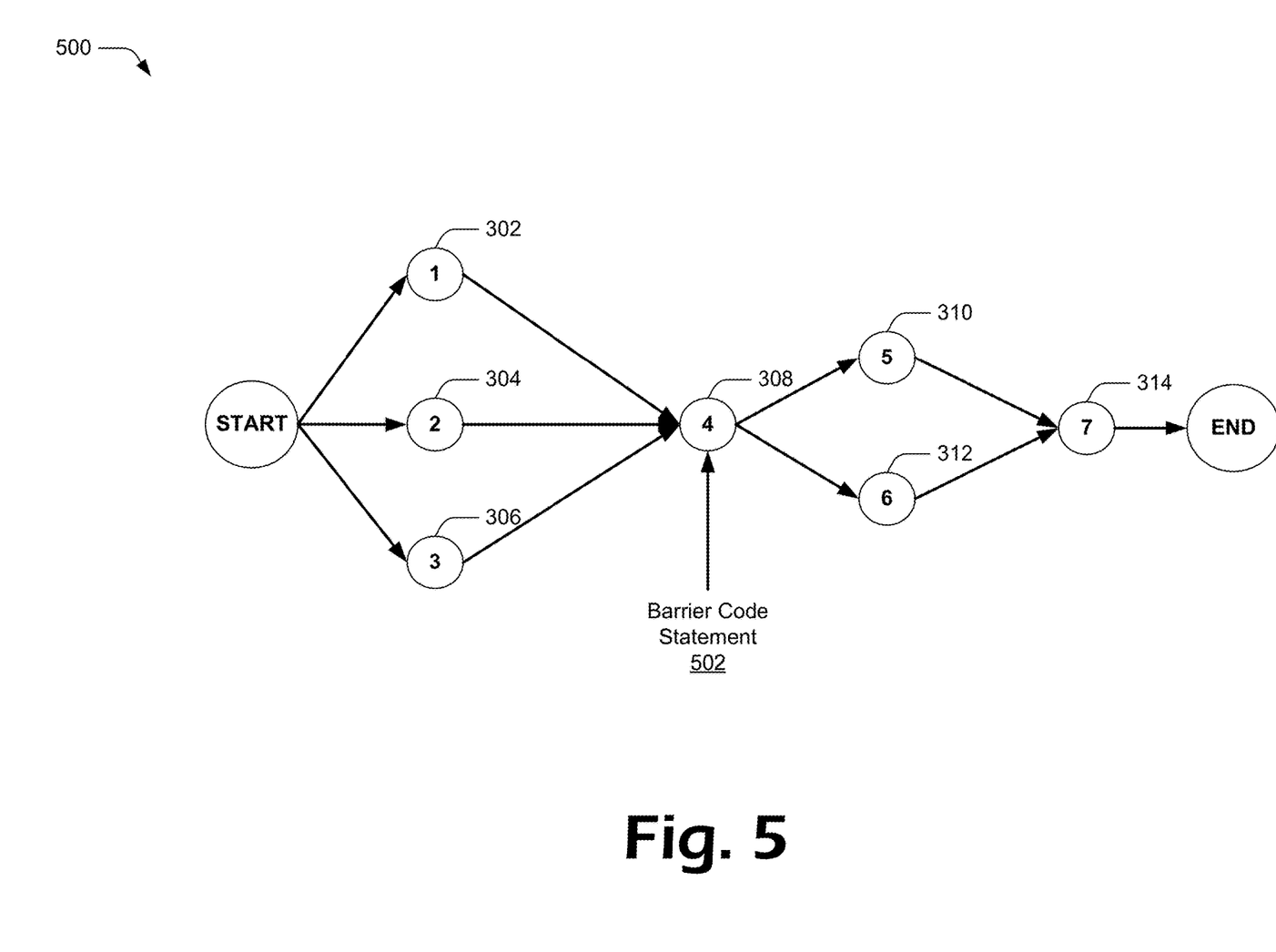
FIG. 5 depicts an example of a partitioned dependency graph.

By way of example, consider FIG. 5 which depicts an example 500 of a partitioned dependency graph. In example 500, the partitioner 206 has identified code statement 308, from the dependency graph 402, as a barrier code statement 502. In this case, code statement 308 has been identified as a barrier code statement because the "alter table" statement of code statement 308 will change the table location, but there is not enough information in the code statements to determine which code statements generate the actual table. Based on identification of code statement 308 as barrier code statement 502, the partitioner moves the location of code statement 308 from being parallel to code statements 302, 304, and 306 to a new location that occurs after completion of code statements 302, 304, and 306 and prior to code statements 310, 312, and 314.

Validator 208 obtains the partitioned dependency graph 224 and the existing annotations 218 and validates the dependencies, e.g., to confirm that the partitioned dependency graph 224 confirms to the rules as debuggable with high performance. If there is an error noted in the partitioned dependency graph 224, then the validator 208 outputs error information 225. This error information 225 can be utilized by the workflow system 112 to correct any errors detected by the validator.

Scheduler 210 obtains the partitioned dependency graph 224 from partitioner 206 and groups the code statements into scheduled jobs 228. As described herein, a scheduled job 228 includes at least one code statement, but may include multiple code statements. The scheduler may consider a variety of factors when scheduling the jobs 228, such as the dependencies 220, debuggability, and maintainability, to name just a few.

Figure 6:
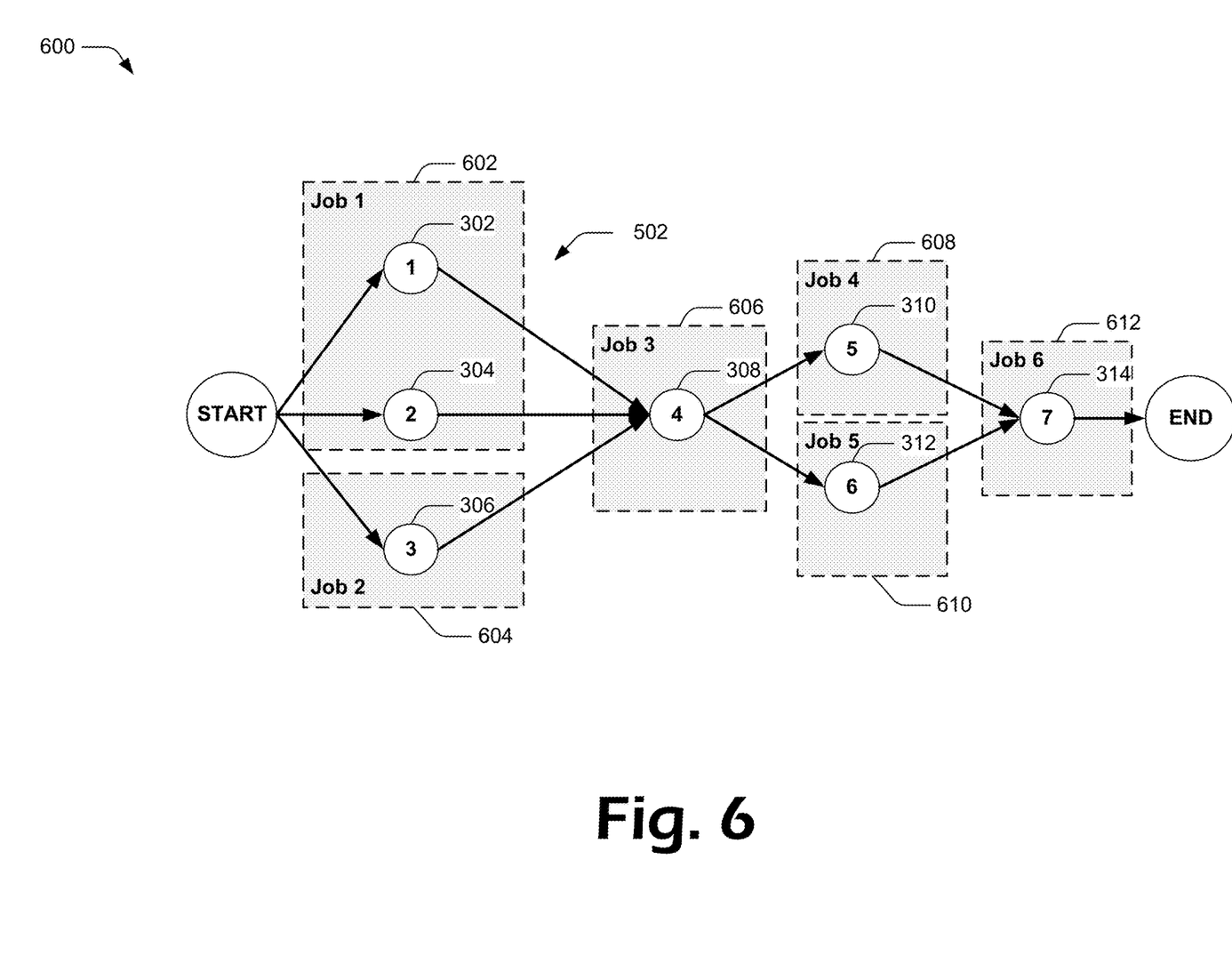
FIG. 6 depicts an example of grouping code statements into scheduled jobs.

By way of example, consider FIG. 6 which depicts an example 600 of grouping code statements into scheduled jobs. In this example, scheduler 210 has grouped code statement 302 and 304 into a first scheduled job 602. As discussed throughout, scheduler 210 can group more than two code statements into a single job, or alternatively may designate a single code statement as a single job. In this example, scheduler 210 has grouped code statements 306, 308, 310, 312, and 314 into scheduled jobs 604, 606, 608, 610, and 612, respectively.

Annotator 212 generates annotated code statements 230 according to the scheduled jobs 228. To do so, annotator 212 automatically embeds annotations 232 into comments of the code statements 116. Doing so has no impact on execution of the code statements, and normally would be ignored by conventional systems. However, the workflow generator 214 of the workflow system 112 is configured to access the information described by the annotations 232 when generating the workflows.

The annotations 232 may include one or more of a job identifier indicating the scheduled job associated with each respective code statement 116 and a dependency indicator identifying dependencies of each respective code statement 116 to other jobs. By way of example, consider FIG. 7 which depicts an example 700 of annotated code statements generated by the annotator 212. Example 700 includes the code statements 302-314 of FIG. 3, but in this case annotator 212 has embedded annotations 702, 704, 706, 708, 710, 712, and 714 with the comments of code statements 302, 304, 306, 308, 310, and 312, respectively. In this example, the annotations are based on the scheduled jobs 228 generated by scheduler 210, and include respective job identifiers indicating the scheduled job associated with each respective code statement. For example, annotation 702 includes a job identifier indicating that code statement 302 is part of job 1. Similarly, annotation 704 includes a job identifier that indicates that code statement 304 is also part of job 1, annotation 706 includes a job identifier that indicates that code statement 306 is part of job 2, annotation 708 includes a job identifier that indicates that code statement 308 is part of job 3, annotation 710 includes a job identifier that indicates that code statement 310 is part of job 4, annotation 712 includes a job identifier that indicates that code statement 312 is part of job 5, and annotation 714 includes a job identifier that indicates that code statement 314 is part of job 6. In this example, therefore, job 1 includes two code statements, while the remaining jobs each include a single code statement. Notably, in some cases a job can include more than two code statements.

Figure 7:
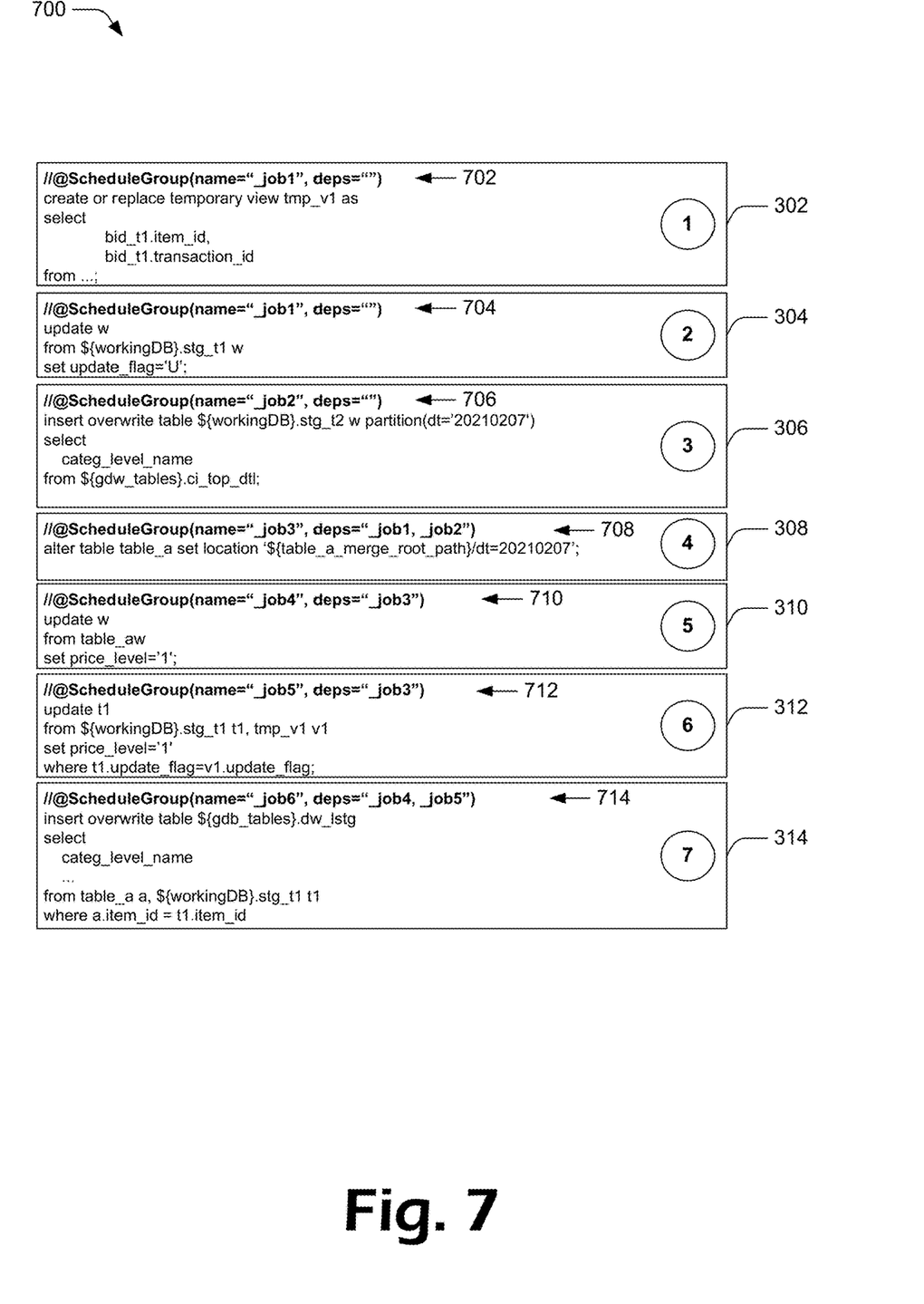
FIG. 7 depicts an example of annotated code statements generated by an annotator.

The annotations in example 700 further include dependency indicators identifying dependencies of each respective code statement. For example, annotation 708 includes a dependency indicator that indicates that codes statement 308 is dependent on both job 1 (which includes code statements 302 and 304) as well as job 2 (which includes code statement 306). Similarly, annotation 710 includes a dependency indicator that indicates that code statement 310 is dependent on job 3 (which includes code statement 312), annotation 712 includes a dependency indicator that indicates that code statement 312 is dependent on job 3 (which includes code statement 312), and annotation 714 includes a dependency indicator that indicates that code statement 314 is dependent on both job 4 (which includes code statement 310) and job 5 (which includes code statement 312).

The workflow generator 214 obtains the annotated code statements 230 and automatically generates a workflow 234 based on the annotated code statements 230. In one or more implementations, the workflow generator leverages an existing workflow engine, such as UC4 or Airflow, in order to generate the workflows according to the annotated code statements 230. For example, the workflow generator 214 may connect to the UC4 or Airflow via an API. The workflow generator then automatically arranges the code statements, using Airflow or UC4, according to the annotations 232 in the annotated code statements 230. Thus, unlike conventional systems in which the user must manually arrange code statements within boxes of the workflow engine, the workflow generator 214 described herein is able to generate the workflow 234 by automatically arranging the code statements using the workflow engine without user input. Notably, the workflow system 112 is compatible with multiple different types of workflow engines, including UC4 and Airflow. The serializer 216 is configured to serialize the code statements and annotations into files 236.

Example Procedures

This section describes example procedures for automatic generation of workflows. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a workflow system, such as workflow system 112.

Figure 8:
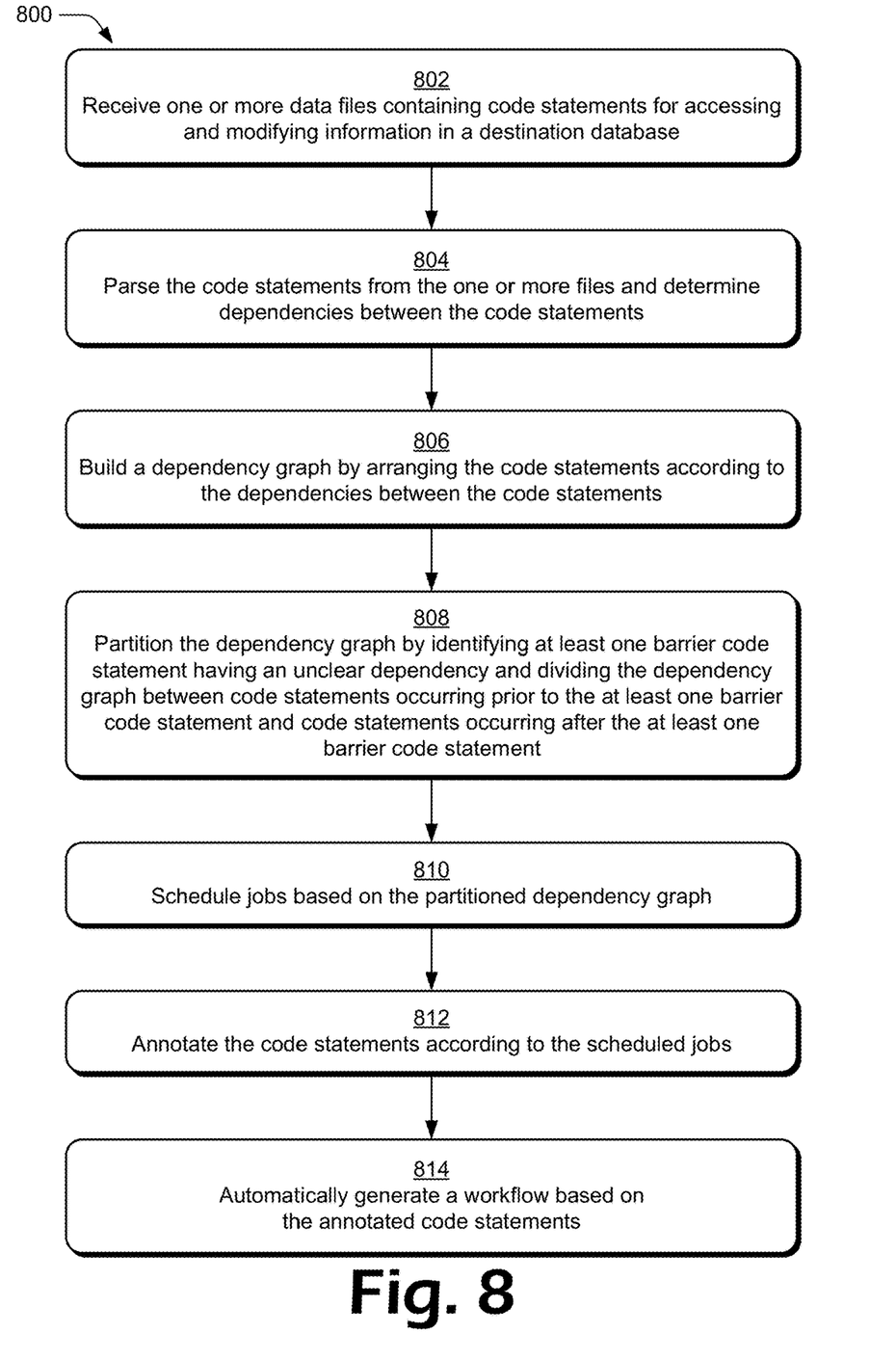
FIG. 8 depicts a procedure in an example implementation in which a workflow is automatically generated from code statements.

FIG. 8 depicts a procedure 800 in an example implementation in which a workflow is automatically generated from code statements.

One or more files containing code statements for accessing and modifying information in a destination database are received (block 802). By way of example, the workflow system 112 obtains files 114 containing code statements 116 from source system 102.

The code statements are parsed from the one or more files and dependencies between the code statements are determined (block 804). By way of example, parser 202 parses the code statements 116 from the files 114 and determines dependencies 220 between the code statements 116.

A dependency graph is built by arranging the code statements according to the dependencies between the code statements (block 806). By way of example, the graph builder 204 obtains the parsed code statements 116 and the dependencies 220 from the parser 202, and builds a dependency graph 222 by arranging the code statements 116 according to the dependencies 220.

The dependency graph is partitioned by identifying at least one barrier code statement having an unclear dependency and dividing the dependency graph between code statements occurring prior to the at least one barrier code statement and code statements occurring after the at least one barrier code statement (block 808). By way of example, partitioner 206 generates a partitioned dependency graph 224 by partitioning the dependency graph 222 generated by the graph builder 204. To do so, the partitioner 206 identifies at least one barrier code statement 226 and divides the dependency graph 222 between the code statements occurring prior to the at least one barrier code statement 226 and code statements occurring after the at least one barrier code statement 226. Generally, the barrier code statement 226 corresponds to a code statement that has an unclear dependency, which makes it difficult to schedule without additional information.

Jobs are scheduled based on the partitioned dependency graph (block 810), and the code statements are annotated according to the scheduled jobs (block 812). By way of example, scheduler 210 obtains the partitioned dependency graph 224 from partitioner 206 and schedules the code statements into scheduled jobs 228. The scheduler may consider a variety of factors when scheduling the jobs 228, such as the dependencies 220, debuggability, and maintainability, to name just a few. Annotator 212 generates annotated code statements 230 according to the scheduled jobs 228. To do so, annotator 212 automatically embeds annotations 232 into comments of the code statements 116. Doing so has no impact on execution of the code statements, and normally would be ignored by conventional systems. The annotations 232 may include one or more of a job identifier indicating the scheduled job associated with each respective code statement 116 and a dependency indicator identifying dependencies of each respective code statement 116 to other jobs.

A workflow is automatically generated based on the annotated code statements (block 814). By way of example, the workflow generator 214 obtains the annotated code statements 230 and automatically generates a workflow 234 based on the annotated code statements 230. In one or more implementations, the workflow generator leverages either UC4 or Airflow API in order to generate the workflows according to the annotated code statements 230.

Example System and Device

Figure 9:
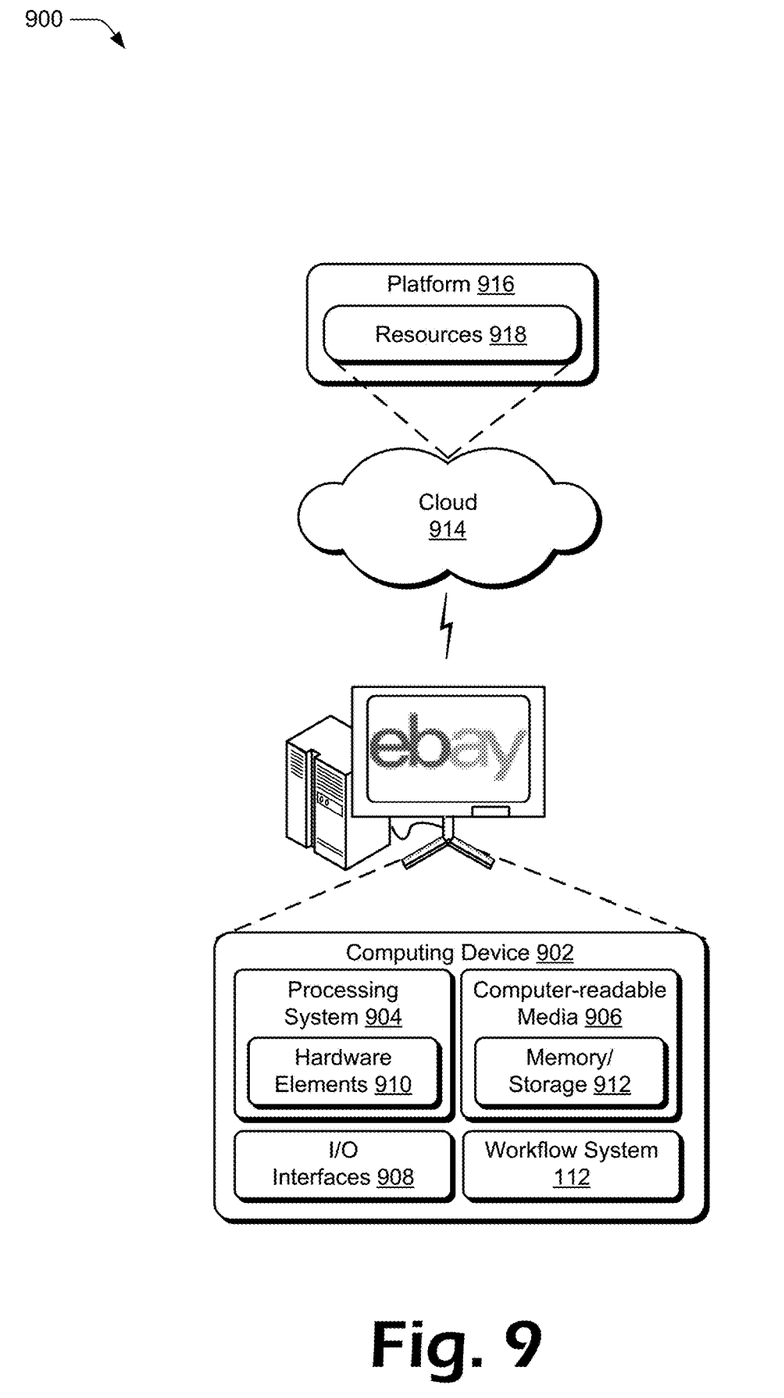
FIG. 9 illustrates an example system that includes an example computing device that is representative of one or more computing systems and/or devices that may implement the various techniques described herein.

FIG. 9 illustrates an example system 900 that includes an example computing device 902 that is representative of one or more computing systems and/or devices that may implement the various techniques described herein. This is illustrated through inclusion of the workflow system 112. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage component 912. The memory/storage component 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A computer-implemented method comprising:
receiving one or more files containing code statements for accessing and modifying information in a destination database;
parsing the code statements from the one or more files and determining dependencies between the code statements;
building a dependency graph by arranging the code statements according to the dependencies between the code statements;
partitioning the dependency graph by identifying at least one barrier code statement having an unclear dependency and dividing the dependency graph between code statements occurring prior to the at least one barrier code statement and code statements occurring after the at least one barrier code statement;
scheduling jobs based on the partitioned dependency graph;
annotating the code statements according to the scheduled jobs, wherein the annotating includes annotating the code statements with a job identifier indicating the scheduled jobs associated with a respective code statement and a dependency indicator identifying dependencies to other scheduled jobs; and
automatically generating a workflow based on the annotated code statements.

2. The computer-implemented method of claim 1, wherein the one or more files each comprise a structured query language (SQL) file containing SQL code statements.

3. The computer-implemented method of claim 1, wherein the annotating automatically embeds annotations into comments of the code statements.

4. The computer-implemented method of claim 3, wherein the workflow is automatically generated according to the annotations.

5. The computer-implemented method of claim 1, further comprising serializing the annotated code statements into files.

6. The computer-implemented method of claim 1, wherein the workflow is automatically generated without accessing table schemas associated with the one or more files.

7. The computer-implemented method of claim 1, further comprising validating the partitioned dependency graph by a validator.

8. The computer-implemented method of claim 7, wherein the validator is configured to output error information if an error is identified in the partitioned dependency graph.

9. A workflow system for automatically generating a workflow from one or more files containing code statements for accessing and modifying information in a destination database, the workflow system comprising:
a parser to parse the code statements from the one or more files and determine dependencies between the code statements;
a graph builder to build a dependency graph by arranging the code statements according to the dependencies between the code statements;
a partitioner to partition the dependency graph by identifying at least one barrier code statement having an unclear dependency and dividing the dependency graph between code statements occurring prior to the at least one barrier code statement and code statements occurring after the at least one barrier code statement;
a scheduler to schedule jobs based on the partitioned dependency graph;
an annotator to annotate the code statements according to the scheduled jobs by annotating the code statements with a job identifier indicating the scheduled jobs associated with a respective code statement and a dependency indicator identifying dependencies to other scheduled jobs; and
a workflow generator to automatically generate the workflow based on the annotated code statements.

10. The workflow system of claim 9, wherein the one or more files each comprises a structured query language (SQL) file containing SQL code statements.

11. The workflow system of claim 9, wherein the annotator automatically embeds annotations into comments of the code statements.

12. The workflow system of claim 11, wherein the workflow generator utilizes the annotations to automatically generate the workflow.

13. The workflow system of claim 9, further comprising a serializer to serialize the annotated code statements into files.

14. The workflow system of claim 9, wherein the workflow is automatically generated without accessing table schemas associated with the one or more files.

15. The workflow system of claim 9, further comprising a validator to validate the partitioned dependency graph.

16. The workflow system of claim 15, wherein the validator is configured to output error information if an error is identified in the partitioned dependency graph.

17. One or more computer-readable storage media comprising instructions stored thereon that, responsive to execution by one or more processors, perform operations comprising:
receiving one or more files containing code statements for accessing and modifying information in a destination database;
parsing the code statements from the one or more files and determining dependencies between the code statements;
building a dependency graph by arranging the code statements according to the dependencies between the code statements;
partitioning the dependency graph by identifying at least one barrier code statement having an unclear dependency and dividing the dependency graph between code statements occurring prior to the at least one barrier code statement and code statements occurring after the at least one barrier code statement;
scheduling jobs based on the partitioned dependency graph;
annotating the code statements according to the scheduled jobs, wherein the annotating includes annotating the code statements with a job identifier indicating the scheduled jobs associated with a respective code statement and a dependency indicator identifying dependencies to other scheduled jobs; and
automatically generating a workflow based on the annotated code statements.

18. The one or more computer-readable storage media of claim 17, wherein the one or more files each comprise a structured query language (SQL) file containing SQL code statements.

19. The one or more computer-readable storage media of claim 17, wherein the annotating automatically embeds annotations into comments of the code statements.

20. The one or more computer-readable storage media of claim 17, wherein the operations further comprise validating the partitioned dependency graph by a validator, wherein the validator is configured to output error information if an error is identified in the partitioned dependency graph.

* * * * *